United States Patent

Amorese et al.

[11] Patent Number: 5,069,423
[45] Date of Patent: Dec. 3, 1991

[54] VALVE FOR CLEAN CHEMICAL REACTOR

[75] Inventors: Franklyn J. Amorese, Hilton; Morris E. Gruver, III, Rochester, both of N.Y.

[73] Assignee: The Pfaudler Companies, Inc., Rochester, N.Y.

[21] Appl. No.: 541,619

[22] Filed: Jun. 21, 1990

[51] Int. Cl.⁵ .................. F16K 51/00; B65D 90/04
[52] U.S. Cl. .................. 251/144; 251/361; 220/457; 239/600
[58] Field of Search .......... 220/426, 457, 465; 251/144, 361; 239/600, 601

[56] References Cited

U.S. PATENT DOCUMENTS

| | | | |
|---|---|---|---|
| 860,865 | 7/1907 | Hartman | 251/361 |
| 1,270,406 | 6/1918 | Goecke | 220/465 |
| 1,343,169 | 6/1920 | Douglass | 220/426 |
| 2,239,509 | 4/1941 | Uecker | 220/465 |
| 2,330,406 | 9/1943 | Murphy | 220/459 |
| 2,454,160 | 11/1948 | Greene | 251/361 |
| 3,352,444 | 11/1967 | Anderson | 220/465 |
| 4,473,171 | 9/1984 | Nunlist | 220/465 |

FOREIGN PATENT DOCUMENTS 2745315  4/1978  Fed. Rep. of Germany ...... 251/144

Primary Examiner—A. Michael Chambers
Attorney, Agent, or Firm—James F. Mudd; Michael L. Dunn

[57] ABSTRACT

A vessel including an emptying means which comprises a valve housing means integral with and fixed to the vessel; a valve body means removably mounted to the valve housing means; a means for sealing the valve body means to the valve housing means; and a valve means which functions to commence and halt the flow of materials from the vessel through the valve housing means and through the valve body means. The valve body means functioning to hold, align and contain the valve means.

The means for sealing also functions to inhibit and prevent the accumulation and retention of contamination from materials flowing from the vessel through the valve housing means and the valve body means past and in direct contact with the means for sealing.

6 Claims, 3 Drawing Sheets

VALVE FOR CLEAN CHEMICAL REACTOR

BACKGROUND OF THE INVENTION

1. Field of the Invention

The present invention relates generally to the field of glass lined chemical reactor vessels and more specifically to valves for regulating gravity induced withdrawal of fluids from within such glass lined chemical reactor vessels.

2. Background of the Prior Art

Many of the glass lined chemical reactor vessels currently being used by the chemical processing industries are designed such that the contents thereof can be withdrawn or emptied from such vessels through valving mechanisms located in the bottoms or lowermost areas of such vessels. Reference to the bottoms or lowermost areas indicates that the designation is applied to such vessels when they are set up in their operating positions. These valving mechanisms, likewise, are often glass coated or "lined" on those areas which are exposed to the materials being processed within such vessels. Because both the interior of the vessel and the valving mechanism are glass coated, thus having brittle surfaces and being susceptible to cracking, the surfaces of such vessels must be smooth and designed with gentle transitions for angles and other directional changes of design lines; there can be no sharp corners (corners typically must be smoothly radiused) and no localized stresses which would tend to distort the smooth surfaces of the glass coating and, thus, tend to break, chip or otherwise separate the glass in relation to its bond to the substrate metal. Mating surfaces are generally designed to spread stress and generally include a flat surface-to-flat surface contact, such as, for example, where mating flanges are employed. Such mating surfaces are, also, usually gasketed both to seal the joint and to, essentially, provide a shock absorber for the glassed surfaces.

There are a variety of different arrangements of such valving mechanisms, many of which use flange concepts, face-to-face, with gaskets interposed therebetween. The valving mechanisms are removably mounted to the vessel bodies so that those valving mechanisms can be removed for cleaning, rebuilding, repairs, etc. An example of such a valving mechanism is shown in U.S. Pat. No. 4,473,171. Other generally conceptually similar valves are well known to those with skill in the art.

There are at least two specific industries, within the general chemical processing industry, which find the current state of the art for glass lined chemical reactor vessel valving mechanisms to be less than acceptable. They are the pharmaceutical industry and the food industry. The reason for this is that all of the presently known valving mechanisms for glass lined chemical reactor vessels tend to provide "pockets", "dams" or other aspects of their designs which tend to accumulate and hold contaminants and which are relatively difficult to maintain in a continuously clean, uncontaminated state. For example, a review of FIG. 3 of U.S. Pat. No. 4,473,171 shows a "pocket" formed between element 26 and element 72 above element 76. This pocket is, of course, a trap for contaminants which might, for example, take the form of spoiled food. To clean such a "pocket", the chemical reactor vessel must be emptied and taken out of service, then the valving mechanism must be loosened from the bottom, and finally, a person must climb into the vessel and retrieve the valve body as would be the case in regard to all the valving mechanism shown in U.S. Pat. No. 4,473,171. In other designs, the valving mechanism can be detached from the exterior of the reactor vessel, but the vessel must still be emptied and taken out of service.

What is necessary and desirable is a glass coated valving mechanism for use with glass lined chemical reactor vessels wherein there are relatively no significant "pockets", "dams" or other aspects of design which trap or accumulate contaminants. The use of such a valving mechanism could increase the time cycles between empty, shut down and removal for cleaning and thus increase the efficiency and enhance the economy of operating the chemical reactor vessel.

BRIEF DESCRIPTION OF THE INVENTION

A valve means is provided, for application to and use with a glass lined vessel, which vessel may be a chemical reactor. The valve means substantially eliminates collection and accumulation trap points, cavities, dams, etc., while at the same time, ensures that the egress point from the vessel is maintained at about the same temperature as that of the interior of the vessel, thus substantially eliminating condensation and migration of materials, e.g., by capillary movement, into and around sealing means which are utilized to seal the jointure of the valve means to the vessel. In one aspect of the invention, the valve means is arranged such that there is no significant, upward facing surface on which contaminants might accumulate and/or be trapped. In another aspect of the invention, all joints between the valve means and the vessel, and within the valve means, itself, which might, in other designs, function to contain contaminants, are blocked from contact with the flow or egress of materials from within the vessel through the valve means.

In yet another aspect of the invention, a portion of the exterior of the valve means is directly exposed to the heating or cooling fluids, which are utilized in jacketed glass lined vessels to determine and maintain the temperature within such vessels; thus the valve means itself is maintained at substantially the same temperature as the interior of the vessel, diminishing the ability of the valve means to act as a heat sink and thermodynamic conductor, i.e., as a "cooling fin". This significantly diminishes the propensity for condensation of materials within the valve means and for the build-up of thermal stresses which can crack or loosen the glass lining.

To summarize, in a vessel there is included a means for emptying that vessel. The means for emptying, in a preferred embodiment, includes a valve housing means which is integral with and fixed, for example, by welding, bolting etc., to the vessel. To the valve housing means is mounted a valve body means; the valve body means is mounted so that it may readily be removed. The valve body means is sealed to the valve housing means by a seal means which is designed to inhibit and prevent the accumulation and retention of contamination from materials flowing from within the vessel, on the seal means. Of course, in relation to the valve body means and the valve housing means, there is a valve means which operates to commence and halt the flow of materials from within the vessel.

DETAILED DESCRIPTION OF THE INVENTION

Figure 1:
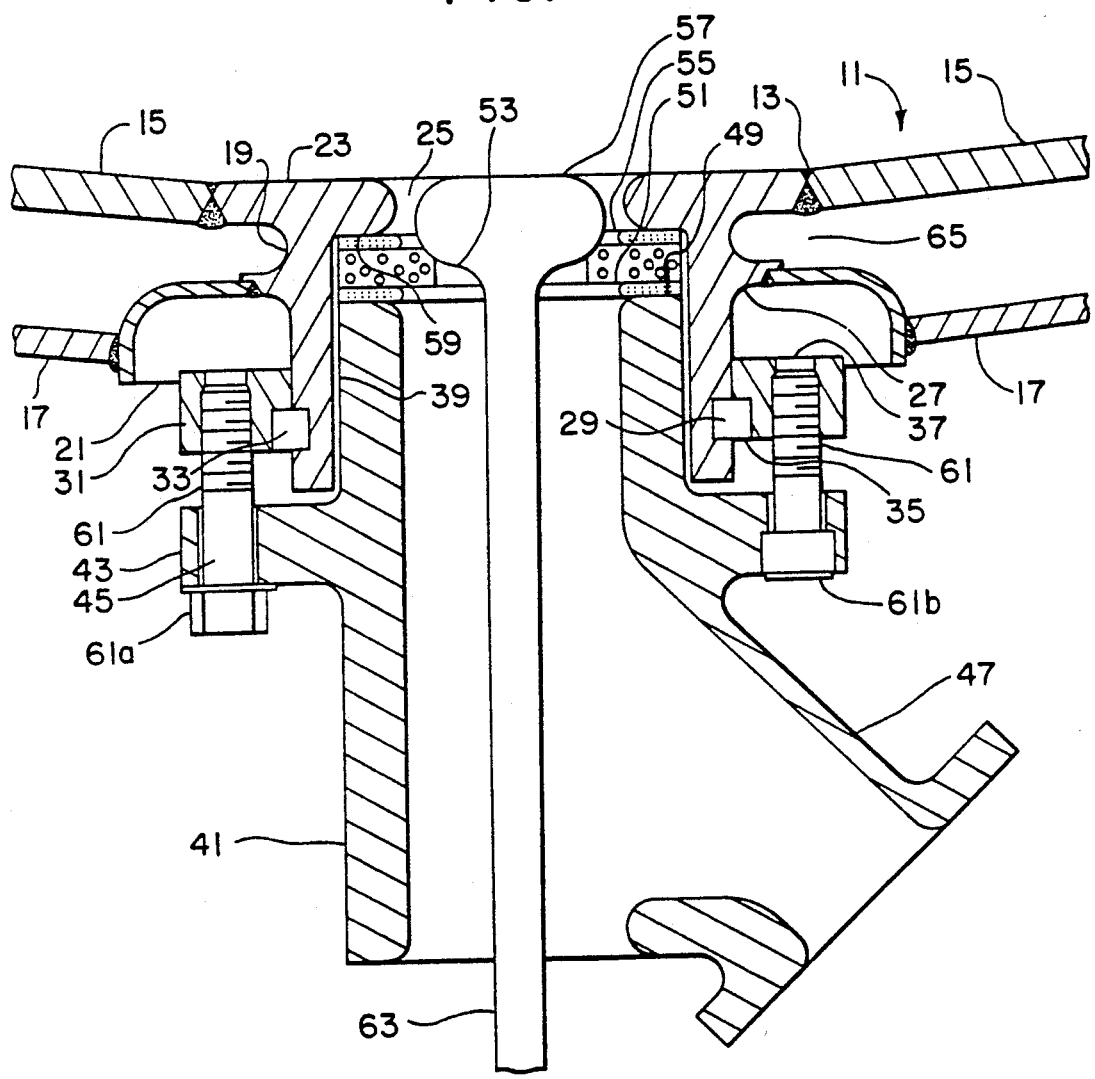
FIG. 1 is a semi-schematic, partially cut-away, elevational view of an embodiment of the valve means of the present invention as fitted to a chemical reactor vessel.

Referring to FIG. 1, vessel 11, which for purposes of illustration may be a reactor vessel, is disposed such that valve port 13 is located so that gravity induced fluid flow is optimized. Valve port 13 is merely an aperture placed through both the vessel body 15 and the shell jacket 17 and sized to fit valve housing 19 and cup shield 21, respectively. Prior to bonding a glass coating to the interior of chemical reactor vessel 11, valve housing 19 is mounted to vessel body 15, and cup shield 21 is mounted to valve housing 19 and shell jacket 17, for example, as is shown in FIG. 1. For example, welding is used to make these mountings. Then, the interiors of vessel body 15 and valve housing 19 are glass coated ("lined") together, as is represented by the heavy lines shown in FIGS. 1, 2 and 3.

Valve housing 19 generally comprises a hollow cylindrical shape, i.e. a tubular shape, which, in the operational position of the chemical reactor vessel 11, as shown in FIG. 1, extends longitudinally about a vertical axis. As viewed in FIG. 1, at the uppermost end of valve housing 19 is port flange 23 which extends radially outwardly from valve housing 19 to the edge of valve port 13 and is fixed thereto, e.g., by welding as is shown. Port flange 23 also extends radially inwardly toward the central axis of valve housing 19 to form fluid port 25 through which materials from within chemical reactor vessel 11 may pass, usually by gravity induced flow. As is shown in FIG. 1, valve housing 19 also includes extension 27 which is fixed to cup shield 21, e.g., by welding.

Valve housing 19 also includes keyway 29 which is in the form of a square-shouldered groove extending circumferentially around the lower portion of valve housing 19 about as shown in FIG. 1. Surrounding the lower portion of valve housing 19 is retainer flange 31 which is in the form of a hollow cylindrical section with the internal bore thereof sized to slidably fit over the lower external cylindrical surface of valve housing 19 but with a fit that is sufficiently close to substantially eliminate most of the play between the congruent surfaces of retainer flange 31 and valve housing 19. Retainer flange 31 also contains a step-bore 33 which is sized to match the sizing of keyway 29 such that when retainer flange 31 is slid along valve housing 19 to a point where step-bore 33 is locationally matched to keyway 29, as shown in FIG. a squared cross-sectional pocket is formed. Interspersed in this squared cross-sectional pocket is key 35 which, likewise, has a square cross section sized to closely match the squared cross-sectional sizing of the pocket formed by step-bore 33 and keyway 29. Otherwise, retainer flange 31 is a hollow cylindrical cross section in the form of a ring. Key 35 may be, for example, axially split to form two 180° arcs or it may only have a single radial cut which permits it to be flexed sufficiently so that it can be urged over the outer diameter of valve housing 19 to be seated in keyway 29. In either case, retainer flange 31 is slid upwardly onto valve housing 19 far enough to leave keyway 29 fully exposed. Key 35 is then seated in keyway 29 and retainer flange 31 is slid downwardly along valve housing 19 to engage key 35 as shown in FIG. 1.

Retainer flange 31 also has a plurality of threaded bolt apertures which function as integral nuts 37. These nuts are usually equidistantly spaced apart on a bolt circle which is larger in diameter than step-bore 33, for example, as is shown in FIG. 1. Nuts 37 extend perpendicularly through the predominant plane of retainer flange 31 parallel to the internal bore thereof.

Slidably fitted into the internal bore 39 of valve housing 19 is valve body 41 which, also, is generally in the form of a hollow cylindrical section. The full interior of valve body 41 is also glass coated ("lined") as is indicated by the heavy lines of FIG. 1. Also, as is so indicated, all other surfaces of valve body 41, which are potentially or actually exposed to the flow of materials from within chemical reactor vessel 11, are glass coated.

To the outer periphery of valve body 41, arranged to correspond in size and location with retainer flange 31, is bolt flange 43, for example, as is shown in FIG. 1. Bolt flange 43 is fixed to valve body 41, extends radially outwardly from the outer surface of valve body 41 and contains bolt apertures 45 which are located to correspond with nuts 37 of retainer flange 31. Bolt flange 43, as shown in FIG. 1, is integral with valve body 41, preferably being part of the same general casting, forging or other shaped piece that is used to produce valve body 41. Also, extending from valve body 41, in one embodiment, is channel 47 which is acutely angled away and extending outwardly and downwardly from the vertical axis of valve body 41 as it is operationally positioned in FIG. 1. Channel 47 is, likewise, a short, hollow, generally cylindrical section similar in sizing to that of valve body 41, and like valve body 41, the interior surface of channel 47 is glass coated. Like bolt flange 43, channel 47 is preferably integral with and a part of valve body 41. Thus, valve body 41, with acutely angled channel 47, generally forms an inverted "Y".

At the upper extreme of valve body 41, as shown in FIG. 1, is body face 49 which is a flat surface perpendicular to the central axis of valve body 41. Body face 49 is glass coated. As can be seen from FIG. 1, mounted onto the horizontal surface of body face 49 is lower seal 51 which, in turn, has mounted to its upper surface, valve seat 53, which, in turn, has mounted to its upper surface, upper seal 55. The upward facing face of upper seal 55 is in contact with downwardly facing port face 59 of port flange 23 adjacent to and extending outwardly away from fluid port 25 to form the lower surface of port flange 23.

Lower seal 51 and upper seal 55 are conventional seals as are well known and used in glass lined chemical reactor vessel connectors, being in the form generally of flat, washer-like gaskets. Examples of suitable seal materials could be neoprene rubber and PTFE fluorinated polymers, depending upon the application in which the chemical reactor vessel is being used. It is preferred, however, that the outer diameters of both lower seal 51 and upper seal 55 are no larger than the internal bore 39 of valve housing 19 and that the inner diameters of lower seal 51 and upper seal 55 are generally about equal to or slightly smaller than the diameter of fluid port 25. This is to ensure a full seal across port face 59 and body face 49 and that there is no projection or surface of either which is not fully in contact with and sealed by either lower seal 51 or upper seal 55. Thus, preferably, no surface of port face 59 or body face 49 is exposed to serve as a collector, pocket, trap or dam for contaminants, residual materials or "dirt".

Interposed between lower seal 51 and upper seal 55 is valve seat 53 which is in the form of a conventional valve seat as used with glass coated poppet-type valves in glass lined reactor vessels. And valve 57 is such a conventional glass coated poppet-type valve which is arranged to be sealably seated against the matting surface of valve seat 53.

To seal valve body 41 to valve housing 19, force must be exerted vertically upwardly on valve body 41 as positioned in FIG. 1. As such force is applied, lower seal 51 and upper seal 55 are deformed by the applied compression force, thus sealing both the upper and lower faces of valve seat 53 as well as body face 49 and port face 59.

Bolts 61, either hex-head as shown at 61a or fillister head as shown at 61b, are slid through bolt apertures 45 and threaded into nuts 37. As bolts 61 are tightened by threading, valve body 41 is urged upwardly applying linear vertically upward force against the combination of lower seal 51, valve seat 53 and upper seal 55, compressing that combination between body face 49 and port face 59.

As bolts 61 are tightened, retainer flange 31 is urged downwardly applying force to key 35 which is prevented from moving downwardly by being locked into keyway 29 and maintained therein by the pocket formed by step-bore 33 and keyway 29.

Poppet valve 57 is raised and lowered in relation to valve seat 53 by a linear force being exerted onto valve stem 63. Channel 47 provides for free flow of material from within the chemical reactor vessel by an alternative pathway to that wherein valve stem 63 is positioned.

Surrounding the upper portion of valve housing 19 is fluid conduit 65 which forms an extension of the space contained by shell jacket 17 and vessel body 15. Fluid conduit 65 provides direct exposure of the exterior of valve housing 19 adjacent to port flange 23, fluid port 25 and the combination seal means comprised of lower seal 51, valve seat 53 and upper seal 55 as compressed between body face 49 and port face 59. Due to the flow of fluid, within the space contained by shell jacket 17, vessel body 15 and fluid conduit 65, being in direct contact with valve housing 19, valve housing 19 and the combination seal means are maintained at a temperature which is substantially the same as that of the contents of chemical reactor vessel 11. Thus, when valve 57 is raised, there is no quick change in temperature caused by the flow of materials from within chemical reactor vessel 11, through fluid port 25 and into valve body 41. Thus, there is no substantial movement, by thermal expansion of the materials of body face 49, lower seal 51, valve seat 53, upper seal 55 and port face 59. Elimination of such thermal expansion induced movement serves to help prevent cracking or separation of the glass coating and to help prevent the formation of gaps and minute pockets which might otherwise form to entrap portions of the flowing material. In addition, the maintenance of this same area, i.e. the seal means and the faces between which it is compressed, at a temperature substantially the same as the materials within chemical reactor vessel 11, substantially reduces the potential for condensation of such materials on areas which are not glass coated. These areas, for example, may be lower seal 51, valve seat 53 and upper seal 55.

Figure 2:
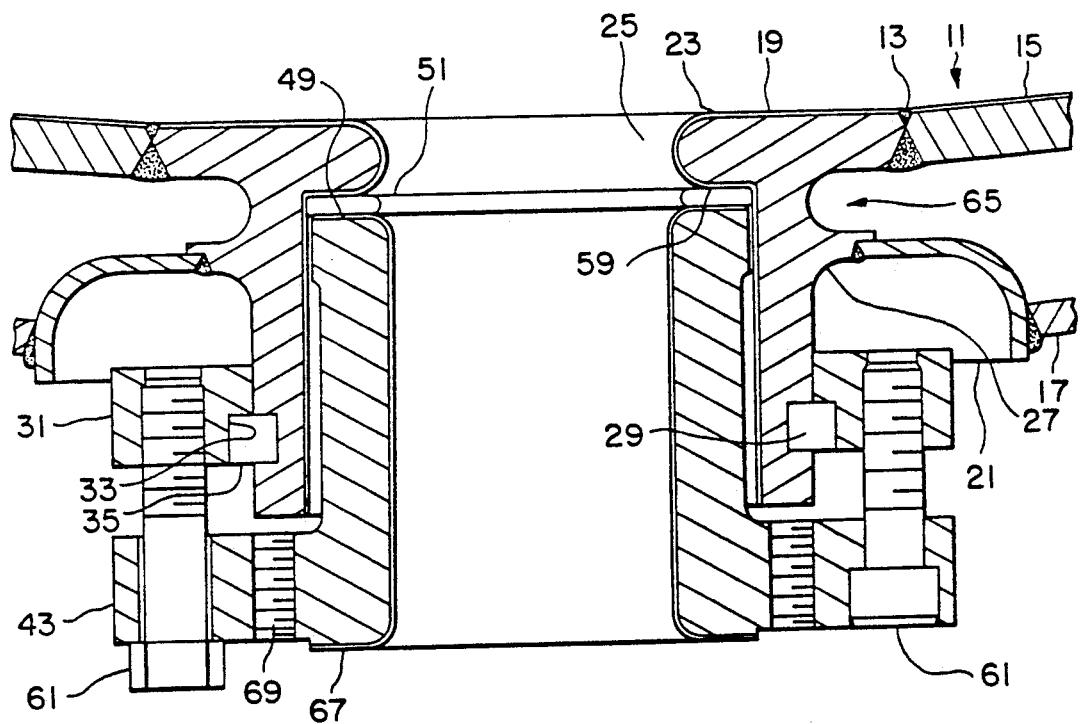
FIG. 2 is a semi-schematic, partially cut-away, elevational view of an adapter assembly, within the scope of the present invention, which can be used to adapt conventional valving means to a chemical reactor vessel.

Referring to FIG. 2, there is seen an alternative embodiment of the present invention arranged such that it does not include valve body 41, valve seat 53, upper seal 55 or valve 57. Rather, it includes receiver body 67 which is generally arranged as a hollow cylindrical section which is glass coated. Receiver body 67 does include bolt flange 43 which may be identical to that described previously in relation to valve body 41. Receiver body 67 also includes body face 49 which may also be identical to that described previously in relation to valve body 41, the difference being that only lower seal 51 is compressed between body face 49 and port face 59.

The application of the alternate FIG. 2 embodiment, containing receiver body 67 rather than valve body 41, is to those situations where specialized valving mechanisms, or other connectors are to be interference fitted into the internal bore of receiver body 67, or bolted to bolt flange 43 by way of attachment apertures 69, as will be well understood by those with skill in the art.

Figure 3:
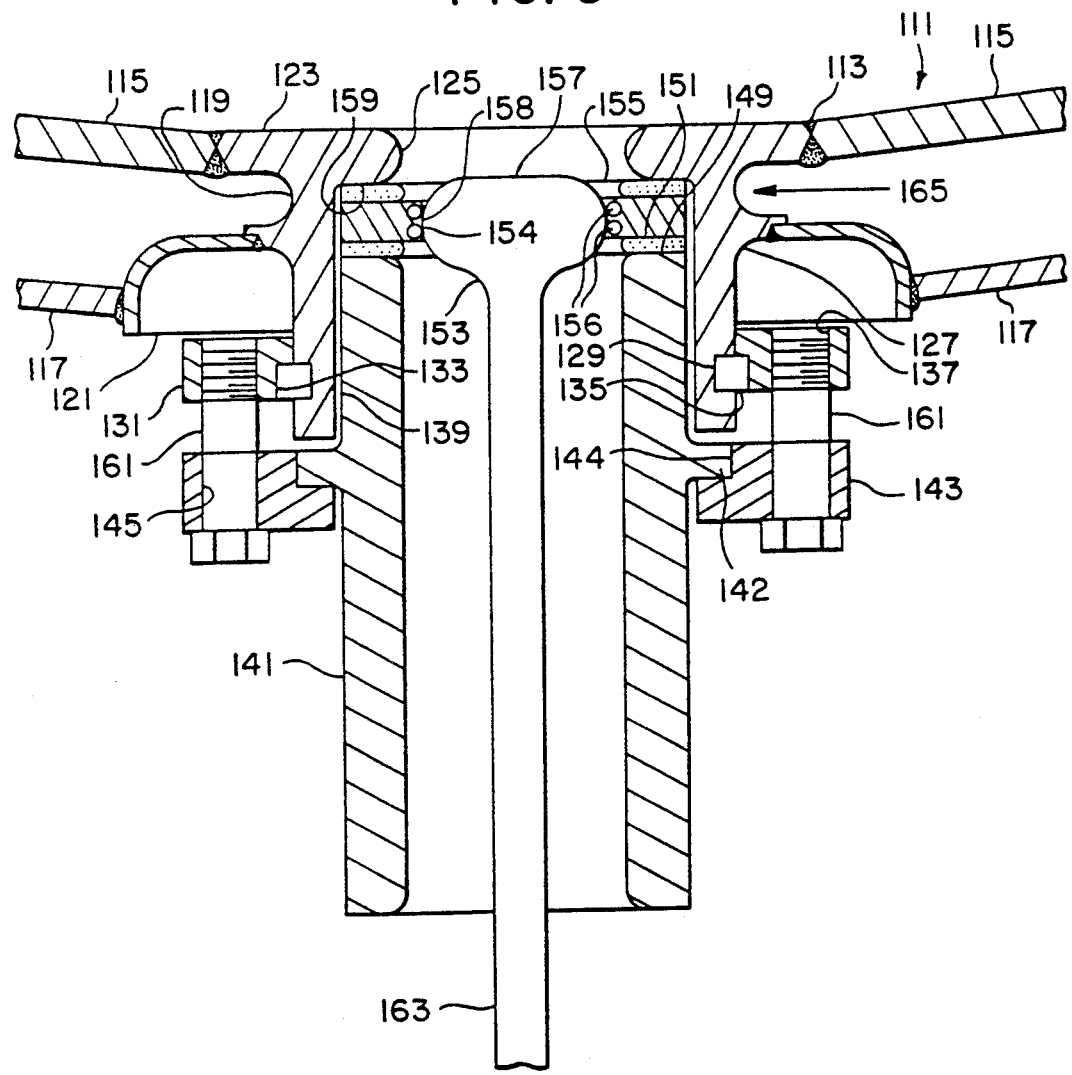
FIG. 3 is a semi-schematic, partially cut-away, elevational view of an alternate embodiment of the valve means of the present invention as fitted to a chemical reactor vessel.

Referring to FIG. 3, vessel 111, which for purposes of illustration may be a reactor vessel, is disposed such that valve port 113 is located so that gravity induced fluid flow is optimized. Valve port 113 is merely an aperture placed through both the vessel body 115 and the shell jacket 117 and sized to fit valve housing 119 and cup shield 121, respectively. Prior to bonding a glass coating to the interior of chemical reactor vessel 111, valve housing 119 is mounted to vessel body 115, and cup shield 121 is mounted to valve housing 119 and shell jacket 117, for example, as is shown in FIG. 3. For example, welding is used to make these mountings. Then, the interiors of vessel body 115 and valve housing 119 are glass coated ("lined") together, as is represented by the heavy lines shown in FIG. 3 as well as in FIGS 1 and 2.

Valve housing 119 generally comprises a hollow cylindrical shape, i.e. a tubular shape, which, in the operational position of the chemical reactor vessel 111, as shown in FIG. 2, extends longitudinally about a vertical axis. As viewed in FIG. 3, at the uppermost end of valve housing 119 is port flange 123 which extends radially outwardly from valve housing 119 to the edge of valve port 113 and is fixed thereto, e.g., by welding as is shown. Port flange 123 also extends radially inwardly toward the central axis of valve housing 119 to form fluid port 125 through which materials from within chemical reactor vessel 111 may pass, usually by gravity induced flow. As is shown in FIG. 3, valve housing 119 also includes extension 127 which is fixed to cup shield 121, e.g., by welding.

Valve housing 119 also includes keyway 129 which is in the form of a square-shouldered grove extending circumferentially around the lower portion of valve housing 129 about as shown in FIG. 3. Surrounding the lower portion of valve housing 119 is retainer flange 131 which is in the form of a hollow cylindrical section with the internal bore thereof sized to slidably fit over the lower external cylindrical surface of valve housing 119 but with a fit that is sufficiently close to substantially eliminate most of the play between the congruent surfaces of retainer flange 131 and valve housing 119. Retainer flange 131 also contains a step-bore 133 which is sized to match the sizing of keyway 129 such that when retainer flange 131 is slid along valve housing 119 to a point where step-bore 133 is locationally matched to keyway 129, as shown in FIG. 3, a squared cross-sectional pocket is formed. Interspersed in this squared cross-sectional pocket is key 135 which, likewise, has a square cross-section sized to closely match the squared cross-sectional sizing of the pocket formed by step-bore 133 and keyway 129. Otherwise, retainer flange 131 is a hollow cylindrical cross section in the form of a ring. Key 135 may be, for example, axially split to form two 180° arcs or it may only have a single radial cut which permits it to be flexed sufficiently so that it can be urged over the outer diameter of valve housing 119 to be seated in keyway 129. In either case, retainer flange 131 is slid upwardly onto valve housing 119 far enough to leave keyway 129 fully exposed. Key 135 is then seated in keyway 129 and retainer flange 131 is slid downwardly along valve housing 119 to engage key 135 as shown in FIG. 3.

Retainer flange 131 also has a plurality of threaded bolt apertures which function as integral nuts 137. These nuts are usually equidistantly spaced apart on a bolt circle which is larger in diameter than step-bore 133, for example, as is shown in FIG. 3. Nuts 137 extend perpendicularly through the predominant plane of retainer flange 131 parallel to the internal bore thereof.

Slidably fitted into the internal bore 139 of valve housing 119 is valve body 141 which, also, is generally in the form of a hollow cylindrical section. The full interior of valve body 141 is also glass coated ("lined") as is indicated by the heavy lines of FIG. 3. Also, as is so indicated, all other surfaces of valve body 141, which are potentially or actually exposed to the flow of materials from within chemical reactor vessel 111, are glass coated.

To the outer periphery of valve body 141 is retainer flange 142 which is in the form of an enlarged radial lip extending perpendicularly from the outer cylindrical surface of valve body 141 about as shown in FIG. 3. Retainer flange 142 is fixed to valve body 141 and extends radially outwardly from the outer surface of valve body 141 to form a shoulder against which step-bore 144 of bolt flange 143 is buttressed. Step-bore 144 is sized to fit snugly to retainer flange 142 such that when bolt flange 143 is slid into engagement with retainer flange 142, bolt flange 143 is concentrically mounted to valve body 141 and extends outwardly from the outer cylindrical surface thereof. Bolt flange 143 contains bolt apertures 145 which ar located to correspond with nuts 137 of retainer flange 131.

At the upper extreme of valve body 141, as shown in FIG. 3, is body face 149 which is a flat surface perpendicular to the central axis of valve body 141. Body face 149 is glass coated. As can be seen from FIG. 3, mounted onto the horizontal surface of body face 149 is lower seal 151 which, in turn, has mounted to its upper surface, valve seat 153, which, in turn, has mounted to its upper surface, upper seal 155. The upward facing face of upper seal 155 is in contact with downwardly facing port face 159 of port flange 123 adjacent to and extending outwardly away from fluid port 125 to form the lower surface of port flange 123.

Lower seal 151 and upper seal 155 are conventional seals as are well known and used in glass lined chemical reactor vessel connectors, being in the form generally of flat, washer-like gaskets. Examples of suitable seal materials could be neoprene rubber and PTFE fluorinated polymers, depending upon the application in which the chemical reactor vessel is being used. It is preferred, however, to ensure that the outer diameters of both lower seal 151 and upper seal 155 are no larger than the internal bore 139 of valve housing 119 and that the inner diameters of lower seal 151 and upper seal 155 are preferably generally about equal to or slightly smaller than the diameter of fluid port 125. This is to ensure a full seal across port face 159 and body face 149 and that there is no projection or surface of either which is not fully in contact with and sealed by either lower seal 151 or upper seal 155. Thus, preferably, no surface of port face 159 or body face 149 is exposed to serve as a collector, pocket, trap or dam for contaminants, residual materials or "dirt".

Interposed between lower seal 151 and upper seal 155 is valve seat 153. Valve seat 153 is generally in the form of a thick washer or a truncated hollow cylindrical section. The thickness and outside diameter of valve seat 153 is preferably generally equivalent to that of valve seat 53 as shown in FIG. 1 and described in relation thereto, however, valve seat 153 is formed of a relatively rigid material, for example, a fluorinated polymer such as PTFE or stainless steel. The bore 154 of valve seat 153 is diametrically sized to be larger than the outside head diameter 158 of valve 157. When valve 157 is in its closed position, as shown in FIG. 3, it is sealed by a set of O-rings 156 interspersed between the outside head diameter 158 of valve 157, and the bore 154 of valve seat 153 is appropriately grooved to fit O-rings 156 as will be well understood by these with skill in the art.

To seal valve body 141 to valve housing 119, force must be exerted vertically upwardly on valve body 141, as positioned in FIG. 3. As such force is applied, lower seal 151 and upper seal 155 are deformed by the applied compression force, thus sealing both the upper and lower faces of valve seat 153 as well as body face 149 and port face 159.

Bolts 161 are slid through bolt apertures 145 and threaded into nuts 137. As bolts 161 are tightened by threading, valve body 141 is urged upwardly applying linear vertically upward force against the combination of lower seal 151, valve seat 153 and upper seal 155, compressing that combination between body face 149 and port face 159.

As bolts 61 are tightened, retainer flange 131 is urged downwardly applying force to key 135 which is prevented from moving downwardly by being locked into keyway 129 and maintained therein by the pocket formed by step-bore 133 and keyway 129. Valve 157 is raised and lowered in relation to valve seat 153 by a linear force being exerted onto valve stem 163.

Surrounding the upper portion of valve housing 119 is fluid conduit 165 which forms an extension of the space contained by shell jacket 117 and vessel body 115. Fluid conduit 165 provides direct exposure of the exterior of valve housing 119 adjacent to port flange 123, fluid port 125 and the combination seal means comprised of lower seal 151, valve seat 153, upper seal 155 and O-rings 156 as compressed between body face 149 and port face 159. Due to the flow of fluid, within the space contained by shell jacket 117, vessel body 115 and fluid conduit 165, being in direct contact with valve housing 119, valve housing 119 and the combination seal means are maintained at a temperature which is substantially the same as that of the contents of chemical reactor vessel 111. Thus, when valve 157 is raised, there is no quick change in temperature caused by the flow of materials from within chemical reactor vessel 111, through fluid port 125 and into valve body 141.

Thus, there is no substantial movement, by thermal expansion of the materials of body face 149, lower seal 151, valve seat 153, upper seal 155 and port face 159. Elimination of such thermal expansion induced movement serves to help prevent cracking or separation of the glass coating and to help prevent the formation of gaps and minute pockets which might otherwise form to entrap portions of the flowing material. In addition, the maintenance of this same area, i.e. the seal means and the faces between which it is compressed, at a temperature substantially the same as the materials within chemical reactor vessel 111, substantially reduces the potential for condensation of such materials on areas which are not glass coated. These areas, for example, may be lower seal 151, valve seat 153 and upper seal 155.

Although the present invention has been described herein with a certain degree of particularity, it is to be understood that the present disclosure has been made as an exemplification of the preferred embodiment of that present invention, and the scope thereof is not considered limited by that description, but rather, is defined by what is hereinafter claimed.

What is claimed is:
1. In a vessel, means for emptying said vessel comprising:
   a) valve housing means integral with and fixed to said vessel;
   b) valve body means removably mounted to said valve housing means;
   c) means for sealing said valve body means to said valve housing means, said means for sealing also functioning to inhibit and prevent the accumulation and retention of contamination from materials flowing from said vessel through said valve housing means and said valve body means past and in direct contact with said means for sealing; and
   d) valve means, wherein said means for sealing said valve body to said valve housing comprises an upper seal and a lower seal, both of which are flat, circular discs with a seal aperture therethrough, said upper seal which is disposed adjacent to a fluid port and against the face of a port flange which extends from said fluid port to the hollow of said valve housing, said lower seal which is disposed parallel to said upper seal but spaced apart therefrom, against said one end of said valve body which is sealably engaged and wherein said valve seating means comprises a valve seat which is a flat circular disc with a seal aperture therethrough, said seat aperture which is tapered shaped and sized to sealably mate with said valve means, said valve seat which is disposed between said upper seal and said lower seal such that linear force exerted against said valve body in a direction parallel to said predominant central axis of both said valve housing and said valve body will tend to compress said lower seal and said upper seal thus sealing said valve body and said valve seat to said valve housing; and said valve body means functioning to hold, align and contain said valve means.

2. In a vessel, means for emptying said vessel comprising:
   a) valve housing means integral with and fixed to said vessel and comprising a generally cylindrical hollow valve housing, a port flange disposed generally perpendicularly to said valve housing and fixed to one end thereof, a fluid port extending through said port flange, said fluid port being smaller in cross sectional size than said hollow of said valve housing and being aligned with the predominant central axis of said valve housing, and keyway means disposed generally perpendicularly to said valve housing but spaced apart, in respect to said predominant central axis of said valve housing, from said port flange, said keyway means extending circumferentially around the periphery of said valve housing, and said keyway means functioning to mount said valve body means to said valve housing;
   b) valve body means removably mounted to said valve housing means and comprising a generally cylindrically hollow valve body means with one end thereof extending within and disposed about the predominant central axis of said valve housing, said one end of said valve body which is sealably engaged with said port flange by said means for sealing, said valve body which includes mounted thereto, a bolt flange extending outwardly from said valve body, said bolt flange which generally forms a plane which is perpendicular to the predominant central axis of said valve body and, concurrently perpendicular to said predominant central axis of said valve housing, said bolt flange which incorporates means for mounting said valve body to said valve housing;
   c) means for sealing said valve body means to said valve housing means, said means for sealing also functioning to inhibit and prevent the accumulation and retention of contamination from materials flowing from said vessel through said valve housing means and said valve body means past and in direct contact with said means for sealing; and further comprising a valve seating means, incorporated with said means for sealing said valve body to said valve housing, and
   d) poppet valve means, said valve seating means which functions to seal said poppet valve means thus effecting a cessation of the flow of materials from within said vessel through said valve housing and said valve body, said poppet valve means which further functions to commence and maintain said flow of materials from within said vessel through said valve housing and said valve body wherein said means for sealing said valve body to said valve housing comprises an upper seal and a lower seal, both of which are flat, circular discs with a seal aperture therethrough, said upper seal which is disposed adjacent to said fluid port and against the face of said port flange which extends from said fluid port to said hollow of said valve housing, said lower seal which is disposed parallel to said upper seal but spaced apart therefrom, against said one end of said valve body which is sealably engaged and wherein said valve seating means comprises a valve seat which is a flat circular disc with a seal aperture therethrough, said seat aperture which is tapered shaped and sized to sealably mate with said poppet valve means, said valve seat which is disposed between said upper seal and said lower seal such that linear force exerted against said valve body in a direction parallel to said predominant central axis of both said valve housing and said valve body will tend to compress said lower seal and said upper seal thus sealing said valve body and said valve seat to said valve housing: and said valve body means functioning to hold, align and contain said valve means.

3. The invention of claim 2 wherein said poppet valve means comprises a poppet valve with a tapered seating face sized and shaped to sealably mate with said seating aperture of said valve seat.

4. In a vessel, means for emptying said vessel comprising:
   a) valve housing means integral with and fixed to said vessel;
   b) valve body means removably mounted to said valve housing means and comprising a generally cylindrically hollow valve body means with one end thereof extending within and disposed about the predominant central axis of said valve housing, said one end of said valve body which is sealably engaged with a port flange by a means for sealing, said valve body which includes mounted thereto, a bolt flange extending outwardly from said valve body, said bolt flange which generally forms a plane which is perpendicular to the predominant central axis of said valve body and, concurrently perpendicular to said predominant central axis of said valve housing, said bolt flange which incorporates means for mounting said valve body to said valve housing;
   c) means for sealing said valve body means to said valve housing means, said means for sealing also functioning to inhibit and prevent the accumulation and retention of contamination from materials flowing from said vessel through said valve housing means and said valve body means past and in direct contact with said means for sealing; and further comprising a valve seating means, incorporated with said means for sealing said valve body to said valve housing, and
   d) poppet valve means, said valve seating means which functions to seal said poppet valve means thus effecting a cessation of the flow of materials from within said vessel through said valve housing and said valve body, said poppet valve means which further functions to commence and maintain said flow of materials from within said vessel through said valve housing and said valve body wherein said means for sealing said valve body to said valve housing comprises an upper seal and a lower seal, both of which are flat, circular discs with a seal aperture therethrough, said upper seal which is disposed adjacent to said fluid port and against the face of said port flange which extends from said fluid port to said hollow of said valve housing, said lower seal which is disposed parallel to said upper seal but spaced apart therefrom, against said one end of said valve body which is sealably engaged and wherein said valve seating means comprises a valve seat which is a flat circular disc with a seal aperture therethrough, said seat aperture which is tapered shaped and sized to sealably mate with said poppet valve means, said valve seat which is disposed between said upper seal and said lower seal such that linear force exerted against said valve body in a direction parallel to said predominant central axis of both said valve housing and said valve body will tend to compress said lower seal and said upper seal thus sealing said valve body and said valve seat to said valve housing; and said valve body means functioning to hold, align and contain said valve means.

5. In a vessel, means for emptying said vessel comprising:
   a) valve housing means integral with and fixed to said vessel and comprising a generally cylindrical hollow valve housing, a port flange disposed generally perpendicularly to said valve housing and fixed to one end thereof, a fluid port extending through said port flange, said fluid port being smaller in cross sectional size than said hollow of said valve housing and being aligned with the predominant central axis of said valve housing, and keyway means disposed generally perpendicularly to said valve housing but spaced apart, in respect to said predominant central axis of said valve housing, from said port flange, said keyway means extending circumferentially around the periphery of said valve housing, and said keyway means functioning to mount said valve body means to said valve housing;
   b) valve body means removably mounted to said valve housing means;
   c) means for sealing said valve body means to said valve housing means, said means for sealing also functioning to inhibit and prevent the accumulation and retention of contamination from materials flowing from said vessel through said valve housing means and said valve body means past and in direct contact with said means for sealing; and further comprising a valve seating means, incorporated with said means for sealing said valve body to said valve housing, and
   d) poppet valve means, said valve seating means which functions to seal said poppet valve means thus effecting a cessation of the flow of materials from within said vessel through said valve housing and said valve body, said poppet valve means which further functions to commence and maintain said flow of materials from within said vessel through said valve housing and said valve body wherein said means for sealing said valve body to said valve housing comprises an upper seal and a lower seal, both of which are flat, circular discs with a seal aperture therethrough, said upper seal which is disposed adjacent to said fluid port and against the face of said port flange which extends from said fluid port to said hollow of said valve housing, said lower seal which is disposed parallel to said upper seal but spaced apart therefrom, against said one end of said valve body which is sealably engaged and wherein said valve seating means comprises a valve seat which is a flat circular disc with a seal aperture therethrough, said seat aperture which is tapered shaped and sized to sealably mate with said poppet valve means, said valve seat which is disposed between said upper seal and said lower seal such that linear force exerted against said valve body in a direction parallel to said predominant central axis of both said valve housing and said valve body will tend to compress said lower seal and said upper seal thus sealing said valve body and said valve seat to said valve housing; and said valve body means functioning to hold, align and contain said valve means.

6. In a vessel, means for emptying said vessel comprising:
   a) valve housing means integral with and fixed to said vessel;
   b) valve body means removably mounted to said valve housing means;

c) means for sealing said valve body means to said valve housing means, said means for sealing also functioning to inhibit and prevent the accumulation and retention of contamination from materials flowing from said vessel through said valve housing means and said valve body means past and in direct contact with said means for sealing; and further comprising a valve seating means, incorporated with said means for sealing said valve body to said valve housing, and d) poppet valve means, said valve seating means which functions to seal said poppet valve means thus effecting a cessation of the flow of materials from within said vessel through said valve housing and said valve body, said poppet valve means which further functions to commence and maintain said flow of materials from within said vessel through said valve housing and said valve body wherein said means for sealing said valve body to said valve housing comprises an upper seal and a lower seal, both of which are flat, circular discs with a seal aperture therethrough, said upper seal which is disposed adjacent to said fluid port and against the face of said port flange which extends from said fluid port to said hollow of said valve housing, said lower seal which is disposed parallel to said upper seal but spaced apart therefrom, against said one end of said valve body which is sealably engaged and wherein said valve seating means comprises a valve seat which is a flat circular disc with a seal aperture therethrough, said seat aperture which is tapered shaped and sized to sealably mate with said poppet valve means, said valve seat which is disposed between said upper seal and said lower seal such that linear force exerted against said valve body in a direction parallel to said predominant central axis of both said valve housing and said valve body will tend to compress said lower seal and said upper seal thus sealing said valve body and said valve seat to said valve housing; and said valve body means functioning to hold, align and contain said valve means.

* * * * *

UNITED STATES PATENT AND TRADEMARK OFFICE
CERTIFICATE OF CORRECTION

PATENT NO. : 5,069,423

DATED : December 3, 1991

INVENTOR(S) : Franklyn J. Amorese et al

It is certified that error appears in the above-identified patent and that said Letters Patent is hereby corrected as shown below:

Column 9, line 38, Claim 1, insert "poppet" before "valve means".

Signed and Sealed this

Ninth Day of November, 1993

Attest:

BRUCE LEHMAN

Attesting Officer

Commissioner of Patents and Trademarks